United States Patent
Sun et al.

(10) Patent No.: US 12,192,896 B2
(45) Date of Patent: Jan. 7, 2025

(54) POWER-SAVING INFORMATION TRANSMISSION METHOD, BASE STATION AND TERMINAL

(71) Applicant: DATANG MOBILE COMMUNICATIONS EQUIPMENT CO., LTD., Beijing (CN)

(72) Inventors: Shaohui Sun, Beijing (CN); Meiying Yang, Beijing (CN); Jiaqing Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 345 days.

(21) Appl. No.: 17/764,542

(22) PCT Filed: Jun. 28, 2020

(86) PCT No.: PCT/CN2020/098426
§ 371 (c)(1),
(2) Date: Mar. 29, 2022

(87) PCT Pub. No.: WO2021/063043
PCT Pub. Date: Apr. 8, 2021

(65) Prior Publication Data
US 2022/0353810 A1 Nov. 3, 2022

(30) Foreign Application Priority Data
Sep. 30, 2019 (CN) .......................... 201910944034.9

(51) Int. Cl.
*H04W 52/02* (2009.01)
*H04L 5/00* (2006.01)

(52) U.S. Cl.
CPC ....... *H04W 52/0212* (2013.01); *H04L 5/0053* (2013.01); *H04W 52/0235* (2013.01)

(58) Field of Classification Search
CPC ......... H04W 52/0212; H04W 52/0235; H04W 52/0216; H04W 72/0453; H04W 52/02;
(Continued)

(56) References Cited

U.S. PATENT DOCUMENTS

| 11,665,685 B2 * | 5/2023 | Jiang | H04W 72/20 370/329 |
| 2010/0210275 A1 * | 8/2010 | Navratil | H04W 52/0229 455/450 |

(Continued)

FOREIGN PATENT DOCUMENTS

| CN | 106105330 A | 11/2016 |
| CN | 106817773 A | 6/2017 |

(Continued)

OTHER PUBLICATIONS

Qualcomm Incorporated,"Cross-slot scheduling power saving techniques", 3GPP TSG-RAN WG1 #98, Prague, Czech Republic, Aug. 26-30, 2019, total 16 pages, R1-1909276.
(Continued)

*Primary Examiner* — Andrew Wendell
(74) *Attorney, Agent, or Firm* — Kilpatrick Townsend & Stockton LLP

(57) ABSTRACT

Embodiments of the present application provide a power-saving information transmission method, a base station, and a terminal. The method includes configuring, by a base station, first power-saving information of a first moment of a first carrier, the first power-saving information being used for indicating transmission of first information of the first carrier and/or a second carrier; and transmitting, by the base station, the first power-saving information. Embodiments of the present application can solve the problem that how to configure the power-saving information of multiple carriers in case that the base station is provided with multiple carriers and a terminal achieves a power-saving effect, and avoid or
(Continued)

mitigate the problem that in case that different energy saving information are configured for different carriers, the terminal cannot save energy as long as the configuration for one carrier is not configured for energy saving, to reduce the power consumption of the terminal.

18 Claims, 2 Drawing Sheets

(58) Field of Classification Search
CPC .. H04L 5/0053; H04L 27/26025; Y02D 30/70
See application file for complete search history.

(56) References Cited

U.S. PATENT DOCUMENTS

| | | | |
|---|---|---|---|
| 2011/0128901 A1 | 6/2011 | Lee et al. | |
| 2011/0244867 A1* | 10/2011 | Zhao | H04W 52/0235 455/458 |
| 2018/0184410 A1* | 6/2018 | John Wilson | H04W 72/20 |
| 2019/0082453 A1* | 3/2019 | Lyu | H04W 72/1273 |
| 2019/0297576 A1 | 9/2019 | Jose et al. | |
| 2019/0313332 A1* | 10/2019 | Wu | H04W 52/0219 |
| 2020/0107340 A1* | 4/2020 | Tang | H04W 72/1263 |
| 2020/0314745 A1* | 10/2020 | Yi | H04W 72/1268 |
| 2020/0314748 A1* | 10/2020 | Kim | H04L 5/0053 |
| 2021/0120574 A1* | 4/2021 | Takeda | H04W 72/23 |
| 2021/0377852 A1* | 12/2021 | Zhou | H04W 76/28 |

FOREIGN PATENT DOCUMENTS

| | | |
|---|---|---|
| CN | 110247685 A | 9/2019 |
| CN | 110719623 A | 1/2020 |
| CN | 111867014 A | 10/2020 |
| JP | 2016529815 A | 9/2016 |
| JP | 2021523656 A | 9/2021 |
| WO | 2019060310 A1 | 3/2019 |
| WO | 2020011084 A1 | 1/2020 |
| WO | 2021063043 A1 | 4/2021 |

OTHER PUBLICATIONS

Huawei et al., "Procedure of cross-slot scheduling for UE power saving", 3GPP TSG RAN WG1 #96bis, Xi'an, China, Apr. 8-12, 2019, total 4 pages, R1-1903987.
InterDigital, Inc.,"On Cross-slot Scheduling for UE Power Saving", 3GPP TSG RAN WG1 #97, Reno, USA, May 13-17, 2019, total 5 pages, R1-1907105.
MediaTek Inc., "Summary of Cross-slot Scheduling Power-Saving Techniques", 3GPP TSG RAN WG1 Meeting #97, Reno, NV, USA, May 13-17, 2019, total 25 pages, R1-1907728.
European Patent Office, Extended European Search Report Issued in Application No. 20871725.6, Sep. 28, 2023, Germany, 13 pages.
Huawei et al., "Procedure of cross-slot scheduling for UE power saving", 3GPP TSG RAN WG1 Meeting #98, Prague, Czech Republic, Aug. 26-30, 2019, total 12 pages, R1-1908070.
CATT, "Power saving scheme with cross-slot scheduling", 3GPP TSG RAN WG1 Meeting #98, Prague, CZ, Aug. 26-30, 2019, total 5 pages, R1-1908606.

* cited by examiner

POWER-SAVING INFORMATION TRANSMISSION METHOD, BASE STATION AND TERMINAL

CROSS-REFERENCE TO RELATED APPLICATIONS

The present application is a National Stage of International Application No. PCT/CN2020/098426, filed on Jun. 28, 2020, which claims priority to Chinese Application No. 201910944034.9 filed on Sep. 30, 2019, entitled "Power-saving Information Transmission Method, Base station and Terminal", which are hereby incorporated by reference in their entireties.

FIELD

The present application relates to the field of communication, and more specifically, to a method for transmitting power-saving information, a base station, and a terminal.

BACKGROUND

In the user equipment (UE) energy saving topic of NR (New Radio) R16 WI, an energy saving method for cross-slot scheduling is proposed. In the energy saving method for cross-slot scheduling, a base station may indicate a minimum value of cross-slot scheduling in advance by transmitting power-saving information and before decoding and scheduling physical downlink control channel (PDCCH), the UE may obtain the minimum value of cross-slot scheduling and then turn off a part of transmission device, including radio frequency device, baseband device, such as data receiving buffer, and reduce a processing speed of the main components, thereby saving energy.

Furthermore, multiple carriers are important features of LTE and NR. In case that multiple carriers are aggregated and support cross-slot scheduling/local slot scheduling, cross-carrier scheduling/local carrier scheduling at the same time, the terminal can perform power-saving related operations on the carriers that have been configured with cross-slot scheduling, namely, the terminal can turn off some devices on the local carrier, turn off the receiving data buffer, and reduce the processing frequency of the CPU.

The current meeting has determined that power-saving information can be carried in the traditional downlink control information DCI, that is, 1 bit is added to indicate power-saving information in the DCI in addition to the traditional scheduling information used to indicate the terminal. The current standard defines that in case that a PDCCH monitoring period arrives, a carrier configured for scheduling will monitor DCI and the scheduled carrier will begin to buffer the data/signals that may arrive at the same time. In the discussion of the cross-carrier scheduling of NR, in case that a scheduling carrier and a scheduled carrier use different subcarrier spacing (SCS), a carrier having a large SCS is used to schedule a carrier having a small SCS, and the terminal can reserve a fixed gap between receiving the scheduled DCI and receiving data in order to reduce data buffering. Furthermore, the standard supports that each BWP (bandwidth partial) may be configured with different power-saving information, and different carriers can be configured with different power-saving information. In addition, the current indication of cross-slot scheduling is determined based on the number of slots. In case that different carriers or different BWPs are configured with different SCS (or numerology), absolute times of corresponding slots are also different.

Based on the current standard definition, there are following three problems:

1) The carrier in which the DCI for cross-carrier scheduling is located may be semi-statically configured, and the terminal also needs to prepare for transmitting and receiving data on a carrier that is not scheduled. As a result, in case that the terminal works on multiple carriers, even in case that a carrier is not scheduled, the terminal needs to buffer data on this carrier, and the terminal cannot save energy.

2) Since the power-saving information can be configured separately for each BWP, in case that different carriers are configured with different power-saving information, as long as a carrier is configured for the local slot scheduling, the terminal may need to be ready for receiving buffered data or monitoring PDCCH at any time. As a result, the terminal cannot save energy in case that working on multiple carriers.

3) In case that different carriers or different BWPs are configured with different SCSs (subcarrier spacing), that how to configure power-saving information for cross-slot scheduling in this case is not discussed and defined in the standard.

Based on the above analysis, the present application further focus on how to configure power-saving information of multiple carriers in case that supporting cross-carrier scheduling/local carrier scheduling, and supporting cross-slot scheduling/local slot scheduling in a multi-carrier scenario, and the terminal can save energy.

SUMMARY

Embodiments of the present application provide methods for transmitting power-saving information, a base station, and a terminal that overcome the above-mentioned problems or at least partially solve the above-mentioned problems.

In a first aspect, according to an embodiment of the present application, a method for transmitting power-saving information is provided, which includes:

configuring, by a base station, first power-saving information of a first carrier at a first time, the first power-saving information being used for indicating transmission of first information of the first carrier and/or a second carrier; and transmitting, by the base station, the first power-saving information.

In a second aspect, an embodiment of the present application provides a method for transmitting power-saving information, which includes:

receiving, by a terminal, first power-saving information of a first carrier at a first time; and transmitting first information at the first time of the first carrier and/or the second carrier based on indication of the first power-saving information.

In a third aspect, an embodiment of the present application provides a base station, which includes:

a first configuring device, configured to configure first power-saving information of a first carrier at a first time, the first power-saving information being used for indicating transmission of first information of at least one of the first carrier and a second carrier; and a first transmitting device, configured to transmit the first power-saving information.

In a fourth aspect, an embodiment of the present application provides a terminal, which includes:

a first receiving device, configured to receive first power-saving information of a first carrier at a first time; and a first information transmitting device, configured to transmit first information at the first time of the first carrier and/or the second carrier based on indication of the first power-saving information.

In a fifth aspect, an embodiment of the present application further provides an electronic device, which includes a processor, and a memory storing computer programs executable on the processor, the computer programs, in case that executed by a processor, cause the processor to implement steps of methods for transmitting power-saving information according to the first and second aspects.

In a sixth aspect, an embodiment of the present application provides a computer-readable storage medium storing computer programs, the computer programs, in case that executed by a processor, cause the processor to implement steps of methods for transmitting power-saving information according to the first and second aspects.

By the methods for transmitting power-saving information, a base station, and a terminal according to embodiments of the present application, it can solve the problem how to configure the power-saving information of multiple carriers in case that the base station is provided with multiple carriers, and a terminal achieves a power-saving effect, and avoid or mitigate the problem that in case that different energy saving information are configured for different carriers, the terminal cannot save energy as long as the configuration on one carrier is not configured for energy saving; and the power consumption of the terminal is reduced.

BRIEF DESCRIPTION OF THE DRAWINGS

In order to more clearly illustrate the embodiments of the present application, the drawings used in the descriptions of the embodiments will be briefly described below. The drawings in the following description are only some embodiments of the present application, and other drawings can be obtained according to the drawings.

DETAILED DESCRIPTION

In order to make the embodiments of the present application more clear, the embodiments of the present application are clearly and completely described in the following with reference to the accompanying drawings in the embodiments of the present application. These embodiments are a part of the embodiments of the present application, and not all of the embodiments.

Figure 1:
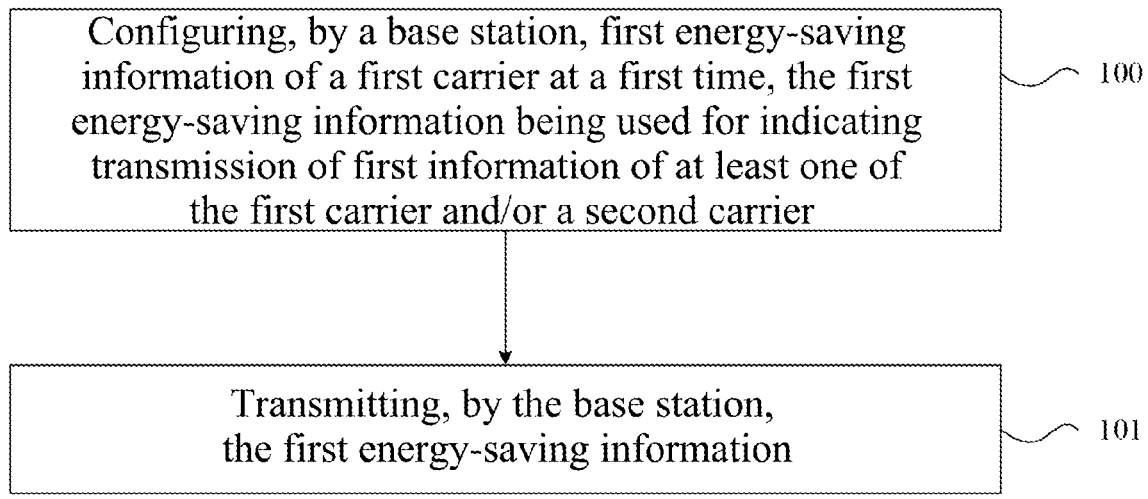
FIG. 1 is a schematic flow chart of a method for transmitting power-saving information according to an embodiment of the present application.

As shown in FIG. 1, it illustrates a schematic flow chart of a method for transmitting power-saving information according to an embodiment of the present application, which includes:

step 100, configuring, by a base station, first power-saving information of a first carrier at a first time, the first power-saving information being used for indicating transmission of first information of the first carrier and/or a second carrier.

According to the embodiment of the present application, the method is performed by a base station. In order to solve the problem that in case that the base station is configured with multiple carriers, the entire terminal cannot save energy as long as the resource scheduling on a carrier is not configured for energy saving, the embodiment of the present application provides configuring first power-saving information of a first carrier at a first time, the first power-saving information being used for indicating transmission of first information of the first carrier and/or the second carrier. It is understandable that in the embodiment of the present application, a minimum value of power-saving information is set for all carriers, and other carriers can perform resource scheduling based on the indication of the first power-saving information, to ensure that a plurality of carriers have the same power-saving information or the same type of power-saving information and the terminal achieves the energy saving effect.

The first information includes at least one of data/signal information and downlink control information (DCI).

The type of power-saving information may include local slot scheduling, cross-slot scheduling, and unlimited scheduling Different minimum application values can be configured for cross-slot scheduling.

The power-saving information includes a cross-slot scheduling parameter and/or a minimum value of the cross-slot scheduling parameter.

The power-saving information in the embodiments of the present application may be referred to as cross-slot scheduling power-saving information, or as the application value of cross-slot scheduling, or as the minimum application value of cross-slot scheduling, or as the application value of power-saving information, or a minimum application value of power-saving information.

The cross-slot scheduling parameters include at least one of the following parameters:

a time interval K0 between PDSCH transmission/reception and PDCCH transmission/reception, a feedback time interval K1 from PDSCH to ACK, a time interval K2 between PUSCH transmission/reception and PDCCH transmission/reception, a time interval between PDCCH transmission/reception and aperiodic CSI-RS transmission/reception, a time interval between PDCCH transmission/reception and SRS transmission/reception, and a time interval between PDCCH transmission/reception and CSI-RS transmission/reception associated with the SRS request. At least one value may be configured for each of the above parameters.

The minimum values of the cross-slot scheduling parameters include at least one of the following:

a minimum value of the time interval K0 between PDSCH transmission/reception and PDCCH transmission/reception, a minimum value of the time interval K2 between PUSCH transmission/reception and PDCCH transmission/reception, a minimum value of the feedback time interval K1 from PDSCH to ACK, a minimum value of the time interval between PDCCH transmission/reception and aperiodic CSI-RS transmission/reception, a minimum value of the time interval between PDCCH transmission/reception and SRS transmission/reception, and a minimum value of the time interval between PDCCH transmission/reception and CSI-RS transmission/reception associated with the SRS request. The minimum value may be a positive integer greater than or equal to zero. At least one value may be configured for each of the above parameters.

The first carrier includes at least one carrier. The first carrier may be a carrier semi-statically configured by the base station, may be a carrier arbitrarily configured by the base station, may be the primary carrier, may be a carrier with the smallest carrier sequence number, may be a carrier with the largest carrier sequence number, or other carriers, which are not limited in the embodiment of the present application.

The second carrier may be completely the same as, partly the same as or completely different from the first carrier.

Step 101, transmitting, by the base station, the first power-saving information.

After configuring the first power-saving information, the base station transmits the first power-saving information, and the first power-saving information is used for indicating information transmission based on the indication of the first power-saving information at the first time.

Based on the method for transmitting power-saving information according to embodiments of the present application, it can solve the problem that how to configure the power-saving information of multiple carriers in case that the base station is provided with multiple carriers, and a terminal achieves a power-saving effect, and avoid or mitigate the problem that in case that different energy saving information are configured for different carriers, the terminal cannot save energy as long as the configuration on one carrier is not configured for energy saving; and the power consumption of the terminal is reduced.

Based on the foregoing embodiment, the method further includes:

configuring, by the base station, second power-saving information of the first carrier and/or the second carrier at a second time, the second power-saving information is used for indicating the transmission of the second information of the first carrier and/or the second carrier, the second time is not earlier than the first time; and transmitting, by the base station, the second power-saving information.

The base station may further configure second power-saving information of the first carrier and/or the second carrier at a second time, the second power-saving information is used for indicating the transmission of the second information of the first carrier and/or the second carrier.

The definition of the second power-saving information can refer to the definition of the first power-saving information, and "first" and "second" are used to distinguish two settings. The definition of the second information can refer to the definition of the first information.

In an embodiment, the size of the second power-saving information is not less than that of the first power-saving information, which can make power-saving information of a plurality of carriers has a same type. For example, the first power-saving information has a minimum application value of K0min=1, and the second power-saving information has a minimum application value of K0min=2, which ensures that the indication based on the first power-saving information and the indication based on the second power-saving information are both power-saving.

Based on the foregoing embodiment, the method further includes:

in case that the second information is not transmitted, configuring, by the base station, to perform the information transmission based on the indication of the first power-saving information at the first time; or configuring to perform the information transmission at the second time based on an indication of a default power-saving information; or configuring to perform the information transmission at the second time based on R15; or configuring to perform unlimited transmission.

In the traditional standard definition, the terminal cannot perform related power-saving operations in case that no data is transmitted. The embodiment of the present application provides power-saving operations in case that no data is transmitted.

In case that no data are scheduled at the second time on at least one carrier of the second carrier, the base station may configure the terminal to buffer data based on the power-saving information indicated by the first carrier. For example, the base station is configured with a plurality of carriers {carrier 1, carrier 2, carrier 3, carrier 4}, the carrier 1 is the first carrier, and the first carrier is configured with the first power-saving information of a cross-slot scheduling of k0min=2, and carrier 2 is one of the carriers in the first carrier set, in case that no data is scheduled at the second time, the terminal can buffer data on carrier 2 based on the indication of the first power-saving information configured for the first carrier, and does not buffer data in the first two slots; or configuring the second carrier to perform data/signal transmission/reception and DCI transmission/reception based on the indication of the power-saving information on the second carrier at the second time; or configuring the second carrier to perform, at the second time, data/signal transmission/reception and DCI transmission/reception based on the indication of a default power-saving information configured by the base station; or configuring the second carrier to perform, at the second time, data transmission/reception and DCI transmission/reception based on R15, that is, the terminal buffers data, and possible DCI monitoring, demodulation and decoding at the beginning; or configuring to perform unlimited transmission.

The embodiment of the present application provides a power-saving operation in case that no data is transmitted, which can further reduce the power consumption of the terminal.

Based on the foregoing embodiment, the method further includes:

before the second power-saving information is transmitted, configuring, by the base station, an indication of the transmission at the second time;

the configuring an indication of the transmission at the second time includes:

configuring to perform the transmission of second information at the second time based on the indication of the first power-saving information at the first time; or configuring to perform the transmission of the second information at the second time based on an indication of a default power-saving information; or configuring to perform the transmission of the second information at the second time based on R15; or configuring to perform unlimited transmission of the second information.

In the traditional standard definition, the terminal cannot perform related power-saving operations in case that no power-saving information is transmitted. The embodiment of the present application provides power-saving operations in case that no power-saving information is transmitted.

In case that the base station does not transmit the second power-saving information at the second time on the second carrier, the base station configures to indicate the transmission at the second time;

It may configure a terminal to perform the transmission of second information at the second time based on the indication of the first power-saving information at the first time.

In some embodiments, it may configure a terminal to perform the transmission of the second information at the second time based on an indication of a default power-saving information.

In some embodiments, it may configure a terminal to perform the transmission of the second information at the second time based on R15.

In some embodiments, the second carrier may not be defined whether to use the configuration of power-saving information at the second time, which is determined by the implementation of the base station.

The embodiment of the present application provides a power-saving operation in case that no power-saving information is transmitted, which can further reduce the power consumption of the terminal.

Based on the foregoing embodiment, the first carrier is the primary carrier, and the second carrier includes at least one secondary carrier.

In case that the first carrier is the primary carrier, the base station configures the first power-saving information of the primary carrier at the first time, the first power-saving information is used to indicate the transmission of the first information of the primary carrier and/or the at least one secondary carrier, that is, all carriers can transmit information based on the indication of the first power-saving information at the first time. In some embodiments, the base station configures the second power-saving information of the primary carrier and/or the at least one secondary carrier at the second time, and the second power-saving information is used to indicate transmission of the second information of the primary carrier and/or the at least one secondary carrier.

Based on the foregoing embodiment, the first carrier is a scheduling carrier, and the second carrier includes a scheduling carrier and/or at least one scheduled carrier.

The base station configures the scheduling carrier of each carrier, which may be local carrier scheduling or cross-carrier scheduling. The scheduling carrier includes at least one carrier, and the scheduled carrier includes at least one carrier.

The scheduling carrier may schedule at least one scheduled carrier. The base station may configure power-saving information for the scheduling carrier and the scheduled carrier.

The power-saving information of the scheduled carrier may have the same configuration as the configuration of power-saving information configured on the scheduling carrier.

In some embodiments, the power-saving information of the scheduled carrier may have the same configuration as the configuration of power-saving information of a third carrier.

The third carrier is any carrier in the set of scheduling carriers and scheduled carriers pre-configured by the base station, and may be any one of a scheduling carrier or the scheduled carriers. The third carrier may be configured by the base station, including statically configuration and semi-statically configuration, and may be dynamically indicated; may be configured by RRC, may be configured by MAC-CE, may be configured by energy saving signal/channel, and may be configured by layer 1 signaling.

Based on the foregoing embodiment, the first carrier and the second carrier includes at least one carrier group. The step of configuring the first power-saving information of the first carrier at the first time by the base station includes:

configuring, by the base station, at least one power-saving information within the carrier group;

in case that the number of power-saving information within the carrier group is greater than or equal to 1, the plurality of power-saving information is the same, or the types of power-saving information indicated by the plurality of power-saving information are the same.

The base station divides a plurality of carriers into N groups. The group includes at least one carrier. The base station configures at least one group, which can be configured in a descending order of the carrier frequency of each carrier; for example, at least one carrier whose carrier frequency difference is less than a first frequency threshold is configured as a group.

In some embodiments, the base station may configure based on a distance between carrier bandwidths; for example, at least one carrier whose total bandwidth is less than a first bandwidth threshold is configured as a group.

In some embodiments, carriers that are adjacent in frequency may be configured as a group; for example, a plurality of carriers that are consecutive in frequency can be configured as a group.

In some embodiments, the base station arbitrarily configures at least one carrier as a group;

The base station regards carriers with similar business characteristics as a group based on business characteristics; for example, businesses with the same QOS level may be classified into a group, or businesses with the same delay requirements are classified into a group;

The base station may group carriers based on a subcarrier spacing (SCS) or physical property numerology configured by different carriers, and configure carriers having the same SCS configuration or small SCS configuration difference as a group.

The subcarrier spacing or bandwidth may be 15 KHz, 30 KHz, 60 KHz, 120 KHz, 240 KHz. The physical property refers to a parameter the mapping relationship between $\mu$ and the subcarrier spacing or bandwidth is shown in Table 1:

TABLE 1

Mapping relationship between $\mu$ and the subcarrier spacing or bandwidth

| $\mu$ | subcarrier spacing or bandwidth $\Delta f = 2^\mu \cdot 15$ [kHz] | Cyclic prefix |
| --- | --- | --- |
| 0 | 15 | normal |
| 1 | 30 | normal |
| 2 | 60 | normal, extended |
| 3 | 120 | normal |
| 4 | 240 | normal |

Based on the configuration of the scheduling carrier, the scheduling carrier and the scheduled carrier indicated by it can be configured as a group.

Other grouping methods can be used, which is not limited thereto.

The base station configures power-saving information for each carrier group. In each group, the base station configures the same power-saving information, or power-saving information for cross-slot scheduling is shared within the group, and the types of a plurality of power-saving information within the carrier group configured by the base station are the same. The sharing power-saving information for cross-slot scheduling in the group may be configuring the power-saving information for a fourth carrier in the group, and each carrier in the group performs cross-slot scheduling based on the indication of the fourth carrier. The fourth carrier may be any carrier in a group arbitrarily configured by the base station, may be a carrier having the smallest carrier sequence number in the group, or may be the carrier having the largest carrier sequence number in the group. The embodiment of the present application does not limit other configuration methods.

The same power-saving information can be configured for the groups. For example, local slot scheduling can be configured for each group.

In some embodiments, different power-saving information can be configured for the groups. For example, in case that the power-saving information is configured as cross-slot scheduling, it is allowable to configure different power-saving information for each of a plurality of groups. For example, the cross-slot scheduling parameter on carrier sequence number 0 has a minimum application value of K0min=1, the cross-slot scheduling parameter on carrier sequence number 1 has a minimum application value of K0min=2.

The embodiment of the present application also considers how to configure the first power-saving information and/or the second power-saving information in case that the carrier is configured with different SCSs.

Based on the foregoing embodiment, the first carrier is the primary carrier, and the second carrier includes at least one secondary carrier. In case that the first carrier and the second carrier are configured with different subcarrier spacing (SCS) or physical property numerology, the first power-saving information and/or second power-saving information are configured based on the first SCS or numerology, where the first SCS or numerology includes:

any one of the different SCS supported by the base station; or

SCS corresponding to the first carrier and/or the second carrier; or

SCS corresponding to the BWP activated by the first carrier and/or the second carrier; or any SCS in a plurality of BWPs of the first carrier and/or the second carrier; or the largest or smallest SCS among the plurality of BWPs of the first carrier and/or the second carrier; or SCS corresponding to an index of the largest or smallest BWP among the plurality of BWPs of the first carrier and/or the second carrier; or the SCS in which the first information of the first carrier is located; or the SCS in which the second information of the second carrier is located; or the SCS in which the first power-saving information of the first carrier is located; or the SCS in which the second power-saving information of the second carrier is located.

Based on the foregoing embodiment, the first carrier is a scheduling carrier, and the second carrier includes a scheduling carrier and/or at least one scheduled carrier. In case that the first carrier and the second carrier are configured with different subcarrier spacing (SCSs) or a physical property numerology, the first power-saving information and/or the second power-saving information are configured based on the first SCS or numerology, the first SCS or numerology includes:

any SCS configured by the base station in the scheduling carrier; or the smallest or largest SCS in the scheduling carrier; or the SCS corresponding to the index of the smallest or largest carrier among the scheduling carriers; or the SCS in which the first information of the first carrier is located; or the SCS in which the second information of the second carrier is located; or the SCS in which the first power-saving information of the first carrier is located; or the SCS in which the second power-saving information of the second carrier is located.

Based on the foregoing embodiment, the first carrier and the second carrier includes at least one carrier group. In case that the first carrier and the second carrier are configured with different subcarrier spacing (SCS) or physical property numerology, the first power-saving information and/or second power-saving information are configured based on the first SCS or numerology, where the first SCS or numerology includes:

any SCS configured by the base station in the carrier group; or the smallest or largest SCS in the carrier group; or the SCS corresponding to the index of the smallest or largest carrier among the scheduling carriers; or the SCS in which the first information of the first carrier is located; or the SCS in which the second information of the second carrier is located; or the SCS in which the first power-saving information of the first carrier is located; or the SCS in which the second power-saving information of the second carrier is located.

Figure 2:
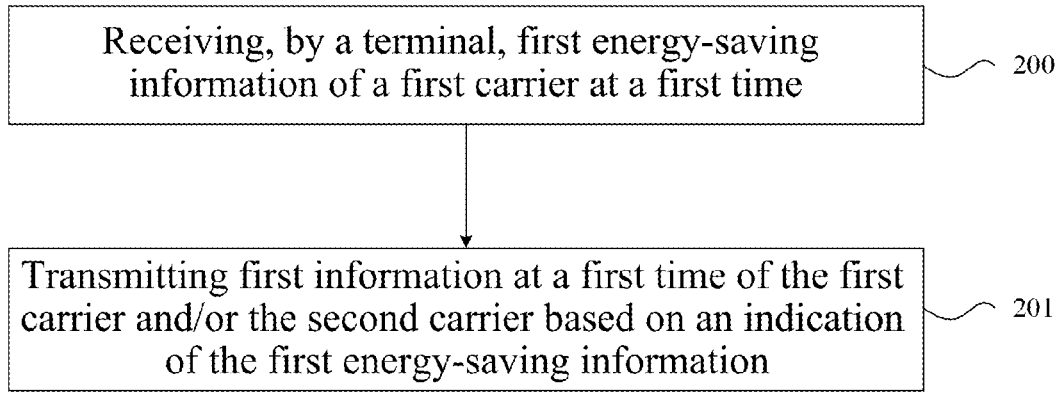
FIG. 2 is a schematic flow chart of a method for transmitting power-saving information according to an embodiment of the present application.

As shown in FIG. 2, it illustrates a schematic flow chart of a method for transmitting power-saving information according to an embodiment of the present application, which includes:

step 200, receiving, by a terminal, first power-saving information of a first carrier at a first time;

The embodiment of the present application is executed by a terminal. In order to solve the problem that in case that the terminal is configured with multiple carriers, the entire terminal cannot save energy as long as the resource scheduling on a carrier is not configured for energy saving, according to the embodiment of the present application, the terminal receives configured first power-saving information of a first carrier at a first time, the first power-saving information being used for indicating transmission of first information of the first carrier and/or the second carrier. It is understandable that in the embodiment of the present application, a minimum value of power-saving information is set for all carriers, and other carriers can perform resource scheduling based on the indication of the first power-saving information, to ensure that a plurality of carriers have the same power-saving information or the same type of power-saving information and the terminal achieves the energy saving effect.

The types of power-saving information include local slot scheduling, cross-slot scheduling, and unlimited scheduling, and different minimum application values can be configured for cross-slot scheduling.

The power-saving information includes at least one of cross-slot scheduling parameters and minimum values of the cross-slot scheduling parameters.

The power-saving information in the embodiments of the present application may be referred to as cross-slot scheduling power-saving information, or as the application value of cross-slot scheduling, or as the minimum application value of cross-slot scheduling, or as the application value of power-saving information, or a minimum application value of power-saving information.

The cross-slot scheduling parameters include at least one of the following:

a time interval K0 between PDSCH transmission/reception and PDCCH transmission/reception, a feedback time interval K1 from PDSCH to ACK, a time interval K2 between PUSCH transmission/reception and PDCCH transmission/reception, a time interval between PDCCH transmission/reception and aperiodic CSI-RS transmission/reception, a time interval between PDCCH transmission/reception and SRS transmission/reception, and a time interval between PDCCH transmission/reception and CSI-RS transmission/reception associated with the SRS request. At least one value may be configured for each of the above parameters.

A minimum value of the cross-slot scheduling parameter, referred to as a minimum value of the cross-slot scheduling, or a minimum application value of power-saving information for the cross-slot scheduling, includes at least one of the following items:

a minimum value of the time interval K0 between PDSCH transmission/reception and PDCCH transmission/reception, a minimum value of the time interval K2 between PUSCH transmission/reception and PDCCH transmission/reception, a minimum value of the feedback time interval K1 from PDSCH to ACK, a minimum value of the time interval between PDCCH transmission/reception and aperiodic CSI-RS transmission/reception, a minimum value of the time interval between PDCCH transmission/reception and SRS transmission/reception, and a minimum value of the time interval between PDCCH transmission/reception and CSI-RS transmission/reception associated with the SRS request. The minimum value may be a positive integer greater than or equal to zero. At least one value may be configured for each of the above parameters.

The first carrier includes at least one carrier. The first carrier may be a carrier semi-statically configured by the base station, may be a carrier arbitrarily configured by the base station, may be the primary carrier, may be a carrier with the smallest carrier sequence number, or a carrier with the largest carrier sequence number, and other methods can be used, which are not limited thereto.

The second carrier may be completely the same as, partly the same as or completely different from the first carrier.

Step 201, transmitting first information at a first time of the first carrier and/or the second carrier based on an indication of the first power-saving information.

After receiving the first power-saving information, the terminal transmits the first information of the first carrier and the second carrier at the first time based on an indication of the first power-saving information.

In an embodiment, the first information includes at least one of data/signal information and downlink control information.

By the methods for transmitting power-saving information according to embodiments of the present application, it can solve the problem how to configure the power-saving information of multiple carriers in case that the terminal is provided with multiple carriers and a terminal achieves a power-saving effect, and avoid or mitigate the problem that in case that different energy saving information are configured for different carriers, the terminal cannot save energy as long as the configuration on one carrier is not configured for energy saving; and the power consumption of the terminal is reduced.

Based on the content of the foregoing embodiment, the method further includes:

receiving second power-saving information of the first carrier and the second carrier at the second time;

transmitting second information of the first carrier and/or the second carrier at the second time based on an indication of the second power-saving information.

The terminal may further receive second power-saving information of the first carrier and/or the second carrier at a second time, the second power-saving information is used to indicate the transmission of the second information of the first carrier and/or the second carrier.

The definition of the second power-saving information can refer to the definition of the first power-saving information, and "first" and "second" are used to distinguish two settings. The definition of the second information can refer to the definition of the first information.

In an embodiment, the size of the second power-saving information is not less than that of the first power-saving information. This configuration can make power-saving information between a plurality of carriers has consistent type. For example, the first power-saving information has a minimum application value of K0min=1, and the second power-saving information has a minimum application value of K0min=2, which ensures that the indication based the first power-saving information and the indication based on the second power-saving information are both power-saving.

Based on the content of the foregoing embodiment, the method further includes:

in case that the second information is not received, transmitting information based on the indication of the first power-saving information at the first time; or transmitting information at the second time based on an indication of a default power-saving information; or transmitting information at the second time based on R15; or performing unlimited transmission at the second time.

In the traditional standard definition, the terminal cannot perform related power-saving operations in case that no data is received. The embodiment of the present application provides power-saving operations in case that no data is received.

In case that the second information is not received, the terminal may buffer the data based on the power-saving information indicated by the first carrier. For example, the base station configured with a plurality of carriers {carrier 1, carrier 2, carrier 3, carrier 4}, carrier 1 is the first carrier, and the first carrier is configured with the first power-saving information having a minimum application value for a cross-slot scheduling of k0min=2, and carrier 2 is one of the carriers in the first carrier set, in case that no data is received at the second time, the terminal can buffer data on carrier 2 based on the indication of the first power-saving information configured for the first carrier, and does not buffer data in the first two slots; or the terminal can perform data/signal transmission/reception and DCI transmission/reception based on the indication of the second power-saving information on the second carrier; or the terminal can perform data/signal transmission/reception and DCI transmission/reception based on the indication of a configured default power-saving information on the second carrier at the second time; or the terminal can configure the second carrier at the second time to perform data transmission/reception and DCI transmission/reception based on R15, that is, performing data caching, and possible DCI monitoring, demodulation and decoding at the beginning; or the second carrier may not be defined whether to use the configuration of power-saving information at the second time, which can be determined by the base station.

The embodiment of the present application provides a power-saving operation in case that no data is transmitted, which can further reduce the power consumption of the terminal.

Based on the foregoing embodiment, the method further includes:

in case that the second power-saving information is not received, transmitting second information at a second time based on the indication of the first power-saving information at the first time; or transmitting the second information at the second time based on an indication of a default power-saving information; or transmitting the second information at the second time based on R15; or performing unlimited the transmission of the second information at the second time.

In the traditional standard definition, the terminal cannot perform related power-saving operations in case that no power-saving information is received from the base station. The embodiment of the present application provides power-saving operations in case that no power-saving information is received.

In case that the second power-saving information is not received, the terminal may transmit information at the second time based on an indication of the power-saving information at the first time, that is, in case that the terminal does not monitor PDCCH on the second carrier, the terminal perform data transmission and reception and DCI transmission and reception based on the indication of the first power-saving information at the first time.

In some embodiments, the terminal may transmit the second information at the second time based on a configured indication of a default power-saving information.

In some embodiments, the terminal can transmit the second information at the second time based on R15, that is, performing data buffering, and possible DCI monitoring, demodulation and decoding at the beginning; or it does not limit the transmission of the second information at the second time.

The embodiment of the present application provides a power-saving operation in case that no power-saving information is transmitted, which can further reduce the power consumption of the terminal.

Based on the content of the foregoing embodiment, the first carrier is the primary carrier, and the second carrier includes at least one secondary carrier.

In case that the first carrier is the primary carrier, the first power-saving information of the primary carrier at the first time is received, the first power-saving information is used to indicate the transmission of the first information of the primary carrier and/or the at least one secondary carrier, that is, all carriers can transmit information based on the indication of the first power-saving information at the first time. In some embodiments, the second power-saving information of the primary carrier and/or the at least one secondary carrier at the second time is received, and the second power-saving information is used to indicate transmission of the second information of the primary carrier and/or the at least one secondary carrier.

Based on the content of the foregoing embodiment, the first carrier is a scheduling carrier, and the second carrier includes a scheduling carrier and/or at least one scheduled carrier.

The base station configures the scheduling carrier for each carrier, which may be local carrier scheduling or cross-carrier scheduling. The scheduling carrier includes at least one carrier, and the scheduled carrier includes at least one carrier.

The scheduling carrier may schedule at least one scheduled carrier. The receiving base station may configure power-saving information for the scheduling carrier and the scheduled carrier.

The power-saving information of the scheduled carrier may have the same configuration as the configuration of power-saving information configured on the scheduling carrier; or The power-saving information of the scheduled carrier may have the same configuration as the configuration of power-saving information of a third carrier.

The third carrier is any carrier in a pre-configured set of scheduling carriers and scheduled carriers, and may be any one of a scheduling carrier or the scheduled carriers. The third carrier may be configured by the base station, including statically configuration and semi-statically configuration, and may be dynamically indicated; may be configured by RRC, MAC-CE configured, may be configured by energy saving signal/channel, and may be configured by layer 1 signaling.

Based on the foregoing embodiment, the first carrier and the second carrier includes at least one carrier group; correspondingly, the step of receiving, by a terminal, the configured first power-saving information of the first carrier at the first time by the base station includes:

receiving, by a terminal, at least one power-saving information within the carrier group;

in case that the number of power-saving information within the carrier group is greater than or equal to 1, the plurality of power-saving information is the same, or the types of power-saving information indicated by the plurality of power-saving information are the same.

The terminal receives power-saving information configured by each carrier group. The terminal receives at least one power-saving information within the carrier group configured by the base station, the base station configures the same power-saving information, or power-saving information for cross-slot scheduling is shared in the group, or the types of a plurality of power-saving information within the carrier group configured by the base station are the same. The sharing power-saving information for cross-slot scheduling in the group may be configuring the power-saving information of a fourth carrier in the group, and each carrier in the group performs cross-slot scheduling based on the indication of the fourth carrier. The fourth carrier may be any carrier in a group arbitrarily configured by the base station, may be a carrier having the smallest carrier sequence number in the group, or may be the carrier having the largest carrier sequence number in the group. Other configuration methods can be used, which is not limited to the embodiment of the present application.

The same power-saving information can be configured for the groups. For example, local slot scheduling can be configured for all the groups; or Different power-saving information can be configured for the groups. For example, in case that the power-saving information is configured as cross-slot scheduling, it is allowable to configure different power-saving information for each of a plurality of groups. For example, the cross-slot scheduling parameter on carrier sequence number 0 has a minimum application value of K0min=1, the cross-slot scheduling parameter on carrier sequence number 1 has a minimum application value of K0min=2.

The embodiment of the present application also considers how to configure the first power-saving information and/or the second power-saving information in case that the carrier is configured with different SCSs.

The subcarrier spacing or bandwidth may be 15 KHz, 30 KHz, 60 KHz, 120 KHz, 240 KHz. The physical property refers to a parameter where the mapping relationship between μ and the subcarrier spacing or bandwidth is shown in Table 1:

TABLE 1

Mapping relationship between μ and subcarrier spacing or bandwidth

| μ | subcarrier spacing or bandwidth $\Delta f = 2^\mu \cdot 15$ [kHz] | Cyclic prefix |
|---|---|---|
| 0 | 15 | normal |
| 1 | 30 | normal |
| 2 | 60 | normal, extended |
| 3 | 120 | normal |
| 4 | 240 | normal |

Based on the foregoing embodiment, the first carrier is the primary carrier, and the second carrier includes at least one secondary carrier. In case that the first carrier and the second carrier are configured with different subcarrier spacing (SCS) or physical property numerology, the first power-saving information and/or second power-saving information configured by the base station based on the first SCS or numerology is received, where the first SCS or numerology includes:

any one of the different SCS supported by the base station; or

SCS corresponding to the first carrier and/or the second carrier; or

SCS corresponding to the BWP activated by the first carrier and/or the second carrier; or any SCS in a plurality of BWPs of the first carrier and/or the second carrier; or the largest or smallest SCS among the plurality of BWPs of the first carrier and/or the second carrier; or SCS corresponding to an index of the largest or smallest BWP among the plurality of BWPs of the first carrier and/or the second carrier; or the SCS in which the first information of the first carrier is located; or the SCS in which the second information of the second carrier is located; or the SCS in which the first power-saving information of the first carrier is located; or the SCS in which the second power-saving information of the second carrier is located.

Based on the foregoing embodiment, the first carrier is a scheduling carrier, and the second carrier includes a scheduling carrier and/or at least one scheduled carrier. In case that the first carrier and the second carrier are configured with different subcarrier spacing (SCSs) or a physical property numerology, the first power-saving information and/or the second power-saving information configured by the base station based on the first SCS or numerology is received, where the first SCS or numerology includes:

any SCS configured by the base station in the scheduling carrier; or the smallest or largest SCS in the scheduling carrier; or the SCS corresponding to the index of the smallest or largest carrier among the scheduling carriers; or the SCS in which the first information of the first carrier is located; or the SCS in which the second information of the second carrier is located; or the SCS in which the first power-saving information of the first carrier is located; or the SCS in which the second power-saving information of the second carrier is located.

Based on the foregoing embodiment, the first carrier and the second carrier includes at least one carrier group. In case that the first carrier and the second carrier are configured with different subcarrier spacing (SCS) or physical property numerology, the first power-saving information and/or second power-saving information are configured based on the first SCS or numerology, where the first SCS or numerology includes:

any SCS configured by the base station in the carrier group; or the smallest or largest SCS in the carrier group; or the SCS corresponding to the index of the smallest or largest carrier among the scheduling carriers; or the SCS in which the first information of the first carrier is located; or the SCS in which the second information of the second carrier is located; or the SCS in which the first power-saving information of the first carrier is located; or the SCS in which the second power-saving information of the second carrier is located.

Figure 3:
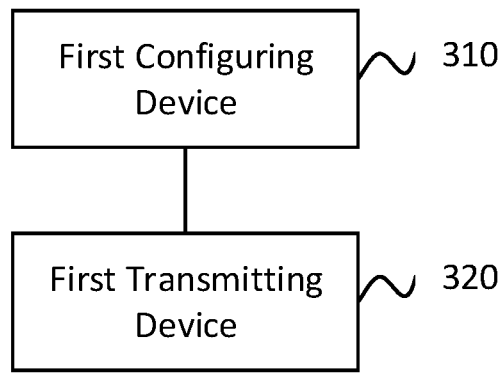
FIG. 3 is a schematic structural diagram of a base station according to an embodiment of the present application.

As shown in FIG. 3, it illustrates a schematic structural diagram of a base station according to an embodiment of the present application, including a first configuring device 310 and a first transmitting device 320.

The first configuring device 310 is configured to configure first power-saving information of a first carrier at a first time, the first power-saving information being used for indicating transmission of first information of at least one of the first carrier and a second carrier.

In order to solve the problem that in case that the base station is configured with multiple carriers, the entire terminal cannot save energy as long as the resource scheduling on a carrier is not configured for energy saving, the embodiment of the present application provides configuring, by the first configuring device 310, first power-saving information of a first carrier at a first time, the first power-saving information being used for indicating transmission of first information of the first carrier and/or the second carrier. It is understandable that in the embodiment of the present application, a minimum value of power-saving information is set for all carriers, and other carriers can perform resource scheduling based on the indication of the first power-saving information, to ensure that a plurality of carriers have the same power-saving information or the same type of power-saving information and the terminal achieves the energy saving effect.

The first information includes at least one of data/signal information and downlink control information (DCI).

The types of power-saving information include local slot scheduling, cross-slot scheduling, and unlimited scheduling different minimum application values can be configured for cross-slot scheduling.

The power-saving information includes at least one of cross-slot scheduling parameters and minimum values of the cross-slot scheduling parameters.

The power-saving information in the embodiments of the present application may be referred to as cross-slot scheduling power-saving information, or as the application value of cross-slot scheduling, or as the minimum application value of cross-slot scheduling, or as the application value of power-saving information, or a minimum application value of power-saving information.

The cross-slot scheduling parameters include at least one of the following:

a time interval K0 between PDSCH transmission/reception and PDCCH transmission/reception, a feedback time interval K1 from PDSCH to ACK, a time interval K2 between PUSCH transmission/reception and PDCCH transmission/reception, a time interval between PDCCH transmission/reception and aperiodic CSI-RS transmission/reception, a time interval between PDCCH transmission/reception and SRS transmission/reception, and a time interval between PDCCH transmission/reception and CSI-RS transmission/reception associated with the SRS request. At least one value may be configured for each of the above parameters.

A minimum value of the cross-slot scheduling parameter, also referred to as a minimum value of the cross-slot scheduling, or a minimum application value of power-saving information for the cross-slot scheduling, includes at least one of the following items:

a minimum value of the time intervals K0 between PDSCH transmission/reception and PDCCH transmission/reception, a minimum value of the time intervals K2 between PUSCH transmission/reception and PDCCH transmission/reception, a minimum value of the feedback time interval K1 from PDSCH to ACK, a minimum value of the time interval between PDCCH transmission/reception and aperiodic CSI-RS transmission/reception, a minimum value of the time interval between PDCCH transmission/reception and SRS transmission/reception, and a minimum value of the time intervals between PDCCH transmission/reception and CSI-RS transmission/reception associated with the SRS request. The minimum value may be a positive integer greater than or equal to zero. At least one value may be configured for each of the above parameters.

The first carrier includes at least one carrier. The first carrier may be a carrier semi-statically configured by the base station, may be a carrier arbitrarily configured by the base station, may be the primary carrier, may be a carrier with the smallest carrier sequence number, or a carrier with the largest carrier sequence number, other methods are not limited in the embodiment of the present application.

The second carrier may be completely the same as, partly the same as or completely different from the first carrier.

The first transmitting device 320 is configured to transmit the first power-saving information.

After configuring the first power-saving information, the first transmitting device 320 transmits the first power-saving information, where the first power-saving information is used for indicating the information transmission based on the indication of the first power-saving information at the first time.

The base station according to embodiments of the present application can solve the problem how to configure the power-saving information of multiple carriers in case that the base station is provided with multiple carriers, and a terminal achieves a power-saving effect, and avoid or mitigate the problem that in case that different energy saving information are configured for different carriers, the terminal cannot save energy as long as the configuration on one carrier is not configured for energy saving; and the power consumption of the terminal is reduced.

Based on the foregoing embodiment, the base station further includes:

a second configuring device, configured to configure second power-saving information of the first carrier and/or the second carrier at a second time, the second power-saving information is used to indicate the transmission of the second information of the first carrier and/or the second carrier, the second time is not earlier than the first time; and a second transmitting device configured to transmit the second power-saving information.

Based on the content of the foregoing embodiment, the base station further includes:

a third configuring device, configured to in case that the second information is not transmitted, configure to perform the information transmission based on the indication of the first power-saving information at the first time; or configure to perform the information transmission at the second time based on an indication of a default power-saving information; or configure to perform the information transmission at the second time based on R15;

or configure to perform unlimited transmission.

Based on the content of the foregoing embodiment, the base station further includes:

a fourth configuring device, configured to before the second power-saving information is transmitted, configure an indication of the transmission at the second time;

the configuring an indication of the transmission at the second time includes:

configuring to perform the transmission of second information at the second time based on the indication of the first power-saving information at the first time; or configuring to perform the transmission of the second information at the second time based on an indication of a default power-saving information; or configuring to perform the transmission of the second information at the second time based on R15; or configuring to perform unlimited transmission of the second information.

Based on the foregoing embodiment, the first carrier is the primary carrier, and the second carrier includes at least one secondary carrier.

Based on the foregoing embodiment, the first carrier is a scheduling carrier, and the second carrier includes a scheduling carrier and/or at least one scheduled carrier.

Based on the foregoing embodiment, the first carrier and the second carrier includes at least one carrier group; correspondingly, the first configuring device is used to:

configure at least one power-saving information within the carrier group;

in case that the number of power-saving information within the carrier group is greater than or equal to 1, the plurality of power-saving information is the same, or the types of power-saving information indicated by the plurality of power-saving information are the same.

Based on the foregoing embodiment, the size of the second power-saving information is not less than that of the first power-saving information.

Based on the foregoing embodiment, in case that the first carrier and the second carrier are configured with different subcarrier spacing (SCSs) or physical property numerology, the first configuring device configures the first power-saving information based on the first SCS or numerology and/or the second configuring device configures the second power-saving information based on the first SCS or numerology, The subcarrier spacing or bandwidth may be 15 KHz, 30 KHz, 60 KHz, 120 KHz, 240 KHz. The physical property refers to a parameter the mapping relationship between μ and the subcarrier spacing or bandwidth is shown in Table 1:

TABLE 1

Mapping relationship between μ
and subcarrier spacing or bandwidth

| μ | subcarrier spacing or bandwidth $\Delta f = 2^\mu \cdot 15$ [kHz] | Cyclic prefix |
|---|---|---|
| 0 | 15 | normal |
| 1 | 30 | normal |
| 2 | 60 | normal, extended |
| 3 | 120 | normal |
| 4 | 240 | normal |

The first SCS or numerology includes:

any one of the different SCS; or

SCS corresponding to the first carrier and/or the second carrier; or

SCS corresponding to the BWP activated by the first carrier and/or the second carrier; or any SCS in a plurality of BWPs of the first carrier and/or the second carrier; or the largest or smallest SCS among the plurality of BWPs of the first carrier and/or the second carrier; or SCS corresponding to an index of the largest or smallest BWP among the plurality of BWPs of the first carrier and/or the second carrier; or the SCS in which the first information of the first carrier is located; or the SCS in which the second information of the second carrier is located; or the SCS in which the first power-saving information of the first carrier is located; or the SCS in which the second power-saving information of the second carrier is located.

Based on the foregoing embodiment, in case that the first carrier and the second carrier are configured with different subcarrier spacing (SCSs) or physical property numerology, the first configuring device configures the first power-saving information based on the first SCS or numerology. and/or the second configuring device configures the second power-saving information based on the first SCS or numerology, and the first SCS or numerology includes:

any SCS configured by the base station in the scheduling carrier; or the smallest or largest SCS in the scheduling carrier; or the SCS corresponding to the index of the smallest or largest carrier among the scheduling carriers; or the SCS in which the first information of the first carrier is located; or the SCS in which the second information of the second carrier is located; or the SCS in which the first power-saving information of the first carrier is located; or the SCS in which the second power-saving information of the second carrier is located.

Based on the foregoing embodiment, in case that the first carrier and the second carrier are configured with different subcarrier spacing (SCSs) or physical property numerology, the first configuring device configures the first power-saving information based on the first SCS or numerology. and/or the second configuring device configures the second power-saving information based on the first SCS or numerology, and the first SCS or numerology includes:

any SCS configured by the base station in the carrier group; or the smallest or largest SCS in the carrier group; or the SCS corresponding to the index of the smallest or largest carrier among the scheduling carriers; or the SCS in which the first information of the first carrier is located; or the SCS in which the second information of the second carrier is located; or the SCS in which the first power-saving information of the first carrier is located; or the SCS in which the second power-saving information of the second carrier is located.

The base stations in the foregoing embodiments are used to implement the foregoing method embodiments. Therefore, the description in the foregoing method embodiments may be used for understanding of the embodiments of the present application, and details are not described herein again.

Figure 4:
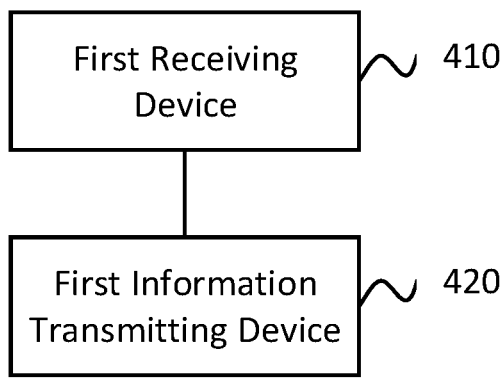
FIG. 4 is a schematic structural diagram of a terminal according to an embodiment of the present application.

As shown in FIG. 4, it illustrates a schematic structural diagram of a terminal according to an embodiment of the present application, including a first receiving device 410 and a first information transmitting device 420.

The first receiving device 410 is configured to receive the first power-saving information of a first carrier at a first time configured by the base station.

In order to solve the problem that in case that the terminal is configured with multiple carriers, the entire terminal cannot save energy as long as the resource scheduling on a carrier is not configured for energy saving, according to the embodiment of the present application, the first receiving device 410 is used to receive configured first power-saving information of a first carrier at a first time, the first power-saving information being used for indicating transmission of first information of the first carrier and/or the second carrier. It is understandable that in the embodiment of the present application, a minimum value of power-saving information is set for all carriers, and other carriers can perform resource scheduling based on the indication of the first power-saving information, to ensure that a plurality of carriers have the same power-saving information or the same type of power-saving information and the terminal achieves the energy saving effect.

The types of power-saving information include local slot scheduling, cross-slot scheduling, and unlimited scheduling, and different minimum application values can be configured for cross-slot scheduling.

The power-saving information includes at least one of cross-slot scheduling parameters and minimum values of the cross-slot scheduling parameters.

The power-saving information in the embodiments of the present application may be referred to as cross-slot scheduling power-saving information, or as the application value of cross-slot scheduling, or as the minimum application value of cross-slot scheduling, or as the application value of power-saving information, or a minimum application value of power-saving information.

The cross-slot scheduling parameters include at least one of the following parameters:

a time interval K0 between PDSCH transmission/reception and PDCCH transmission/reception, a feedback time interval K1 from PDSCH to ACK, a time interval K2 between PUSCH transmission/reception and PDCCH transmission/reception, a time interval between PDCCH transmission/reception and aperiodic CSI-RS transmission/reception, time intervals between PDCCH transmission/reception and SRS transmission/reception, and a time interval between PDCCH transmission/reception and CSI-RS transmission/reception associated with the SRS request. At least one value may be configured for each of the above parameters.

A minimum value of the cross-slot scheduling parameter, referred to as a minimum value of the cross-slot scheduling, or a minimum application value of power-saving information for the cross-slot scheduling, includes at least one of the following items:

a minimum value of the time intervals K0 between PDSCH transmission/reception and PDCCH transmission/reception, a minimum value of the time interval K2 between PUSCH transmission/reception and PDCCH transmission/reception, a minimum value of the feedback time interval K1 from PDSCH to ACK, a minimum value of the time interval between PDCCH transmission/reception and aperiodic CSI-RS transmission/reception, a minimum value of the time interval between PDCCH transmission/reception and SRS transmission/reception, and a minimum value of the time interval between PDCCH transmission/reception and CSI-RS transmission/reception associated with the SRS request. The minimum value may be a positive integer greater than or equal to zero. At least one value may be configured for each of the above parameters.

The first carrier includes at least one carrier. The first carrier may be a carrier semi-statically configured by the base station, may be a carrier arbitrarily configured by the base station, may be the primary carrier, may be a carrier with the smallest carrier sequence number, may be a carrier with the largest carrier sequence number, or other carriers which are not limited in the embodiment of the present application.

The second carrier may be completely the same as, partly the same as or completely different from the first carrier.

A first information transmitting device 420 is configured to transmit first information at a first time of the first carrier and/or the second carrier based on an indication of the first power-saving information.

The first information transmitting device 420 is configured to transmit, after receiving the first power-saving information, first information at a first time of the first carrier and/or the second carrier based on an indication of the first power-saving information.

In an embodiment, the first information includes at least one of data/signal information and downlink control information.

The terminal according to embodiments of the present application can solve the problem how to configure the power-saving information of multiple carriers in case that the terminal is provided with multiple carriers, and a terminal achieves a power-saving effect, and avoid or mitigate the problem that in case that different energy saving information are configured for different carriers, the terminal cannot save energy as long as the configuration on one carrier is not configured for energy saving; and the power consumption of the terminal is reduced.

Based on the foregoing embodiment, the terminal further includes:

a second receiving device, configured to receive second power-saving information of the first carrier and the second carrier at the second time;

a second information transmitting device configured to transmit second information at a second time of the first carrier and/or the second carrier based on an indication of the second power-saving information.

Based on the foregoing embodiment, the terminal further includes: a third information transmitting device configured to in case that second information is not received, transmit information based on an indication of the first power-saving information at the first time; or transmit information at the second time based on an indication of a default power-saving information; or transmit information at the second time based on R15; or perform unlimited transmission at the second time.

Based on the foregoing embodiment, the terminal further includes: a fourth information transmitting device configured to in case that second power-saving information is not received, transmit second information at a second time based on an indication of the first power-saving information at the first time; or transmit the second information at the second time based on an indication of a default power-saving information; or transmit the second information at the second time based on R15; or perform unlimited transmission of the second information at the second time.

Based on the foregoing embodiment, the first carrier is the primary carrier, and the second carrier includes at least one secondary carrier.

Based on the foregoing embodiment, the first carrier is a scheduling carrier, and the second carrier includes a scheduling carrier and/or at least one scheduled carrier.

Based on the foregoing embodiment, the first carrier and the second carrier includes at least one carrier group; correspondingly, the first receiving device is used to:

receive at least one power-saving information within the carrier group;

in case that the number of power-saving information within the carrier group is greater than or equal to 1, the plurality of power-saving information is the same, or the types of power-saving information indicated by the plurality of power-saving information are the same.

Based on the foregoing embodiment, the size of the second power-saving information is not less than that of the first power-saving information.

Based on the foregoing embodiment, in case that the first carrier and the second carrier are configured with different subcarrier spacing (SCSs) or physical property numerology, the first receiving device is configured to receive the first power-saving information configured by the base station based on the first SCS or numerology and/or the second receiving device is configured to receive the second power-saving information configured by the base station based on the first SCS or numerology, The subcarrier spacing or bandwidth may be 15 KHz, 30 KHz, 60 KHz, 120 KHz, 240 KHz. The physical property refers to a parameter the mapping relationship between $\mu$ and the subcarrier spacing or bandwidth is shown in Table 1:

TABLE 1

Mapping relationship $\mu$ and the subcarrier spacing or bandwidth

| $\mu$ | subcarrier spacing or bandwidth $\Delta f = 2^\mu \cdot 15$ [kHz] | Cyclic prefix |
|---|---|---|
| 0 | 15 | normal |
| 1 | 30 | normal |
| 2 | 60 | normal, extended |
| 3 | 120 | normal |
| 4 | 240 | normal |

The first SCS or numerology includes:

any one of the different SCS supported by the base station; or

SCS corresponding to the first carrier and/or the second carrier; or

SCS corresponding to the BWP activated by the first carrier and/or the second carrier; or any SCS in a plurality of BWPs of the first carrier and/or the second carrier; or the largest or smallest SCS among the plurality of BWPs of the first carrier and/or the second carrier; or SCS corresponding to an index of the largest or smallest BWP among the plurality of BWPs of the first carrier and/or the second carrier; or the SCS in which the first information of the first carrier is located; or the SCS in which the second information of the second carrier is located; or the SCS in which the first power-saving information of the first carrier is located; or the SCS in which the second power-saving information of the second carrier is located.

Based on the foregoing embodiment, in case that the first carrier and the second carrier are configured with different subcarrier spacing (SCSs) or physical property numerology, the first receiving device is configured to receive the first power-saving information configured by the base station based on the first SCS or numerology and/or the second receiving device is configured to receive the second power-saving information configured by the base station based on the first SCS or numerology, and the first SCS or numerology includes:

any SCS configured by the base station in the scheduling carrier; or the smallest or largest SCS in the scheduling carrier; or the SCS corresponding to the index of the smallest or largest carrier among the scheduling carriers; or the SCS in which the first information of the first carrier is located; or the SCS in which the second information of the second carrier is located; or the SCS in which the first power-saving information of the first carrier is located; or the SCS in which the second power-saving information of the second carrier is located.

Based on the foregoing embodiment, in case that the first carrier and the second carrier are configured with different subcarrier spacing (SCSs) or physical property numerology, the first receiving device is configured to receive the first power-saving information configured by the base station based on the first SCS or numerology and/or the second receiving device is configured to receive the second power-saving information configured by the base station based on the first SCS or numerology, and the first SCS or numerology includes:

any SCS configured by the base station in the carrier group; or the smallest or largest SCS in the carrier group; or the SCS corresponding to the index of the smallest or largest carrier among the scheduling carriers; or the SCS in which the first information of the first carrier is located; or the SCS in which the second information of the second carrier is located; or the SCS in which the first power-saving information of the first carrier is located; or the SCS in which the second power-saving information of the second carrier is located.

The terminals in the foregoing embodiments are used to implement the foregoing method embodiments. Therefore, the description in the foregoing method embodiments may be used for understanding of the embodiments of the present application, and details are not described herein again.

Figure 5:
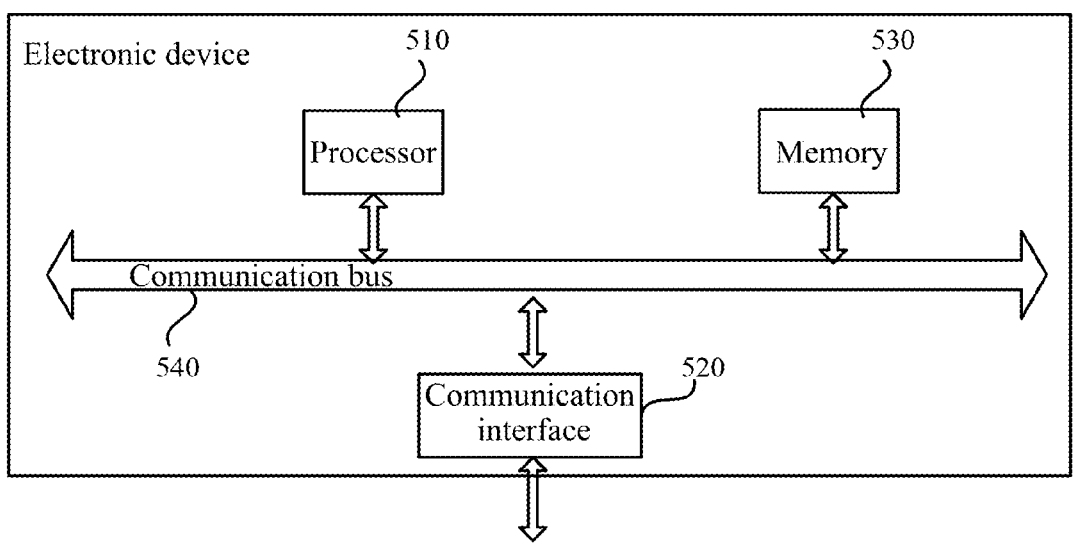
FIG. 5 is a schematic diagram of an electronic device according to an embodiment of the present application.

FIG. 5 is a schematic diagram of an electronic device according to an embodiment of the present application. As shown in FIG. 5, the electronic device may include a processor 510, a communication interface 520, a memory 530, and a communication bus 540. The processor 510, the communication interface 520, and the memory 530 communicate with each other through the communication bus 540. The processor 510 may call computer programs that are stored on the memory 530 and executable on the processor 510 to implement the method for transmitting power-saving information according to the foregoing method embodiment, for example, including: configuring, by a base station, first power-saving information of a first carrier at a first time, the first power-saving information being used for indicating transmission of first information of at least one of the first carrier and a second carrier; and transmitting, by the base station, the first power-saving information.

The processor 510 may call computer programs that are stored on the memory 530 and executable on the processor 510 to implement the method for transmitting power-saving information according to the foregoing method embodiment. For example, the method may include: receiving, by a terminal, first power-saving information of a first carrier at a first time; and transmitting first information at a first time of the first carrier and/or the second carrier based on an indication of the first power-saving information.

In addition, the logic instructions in the memory 530 described above may be implemented in the form of computer-executable commands and may be stored in a computer readable storage medium while being sold or used as a separate product. Therefore, an embodiment of the present application provides a computer software product, which is stored in a storage medium and includes several instructions to enable a computer device (for example, a personal computer, a server, or a network device, etc.) to perform all or part of the steps of the method described in each embodiment of the present application. The storage medium described above includes various media that can store program codes such as U disk, mobile hard disk, read-only memory (ROM), random access memory (RAM), magnetic disk, or optical disk.

The embodiments of the present application further provide a non-transitory computer-readable storage medium having stored thereon computer programs, the computer programs are executed by the processor to implement the method for transmitting power-saving information according to the foregoing method embodiment. For example, the method may include: configuring, by a base station, first power-saving information of a first carrier at a first time, the first power-saving information being used for indicating transmission of first information of at least one of the first carrier and a second carrier; and transmitting, by the base station, the first power-saving information.

The embodiments of the present application further provide a non-transitory computer-readable storage medium having stored thereon computer programs, the computer programs are executed by the processor to implement the method for transmitting power-saving information according to the foregoing method embodiment, for example, including: receiving, by a terminal, first power-saving information of a first carrier at a first time; and transmitting first information at a first time of the first carrier and/or the second carrier based on an indication of the first power-saving information.

The device embodiments described above are merely illustrative, and the units described as separate components may or may not be physically separate, and the components displayed as units may or may not be physical units, that is, may be located at the same place or be distributed to multiple network units. Some or all of the modules may be selected according to actual needs to achieve the purpose of the solution of the present embodiment.

Through the description of the embodiments above, various embodiments can be implemented by means of software and a necessary general hardware platform, and of course, by hardware. Based on such understanding, the embodiments of the present application in essence or a part of the embodiments that contributes to the prior art, or a part of the embodiments, may be embodied in the form of a software product, which may be stored in a storage medium such as ROM/RAM, magnetic discs, optical discs, etc., and includes several instructions to cause a computer device (which may be a personal computer, server, or network device, etc.) to perform the methods described in various embodiments or a part thereof.

The invention claimed is:

1. A method for transmitting power-saving information, comprising:
 configuring, by a base station, first power-saving information of a first carrier at a first time, the first power-saving information being used for indicating transmission of first information on the first carrier and/or a second carrier;
 transmitting, by the base station, the first power-saving information;
 configuring, by the base station, second power-saving information of the first carrier and/or the second carrier at a second time, the second power-saving information being used for indicating transmission of second information on the first carrier and/or the second carrier, the second time being not earlier than the first time; and
 transmitting, by the base station, the second power-saving information,
 wherein the first power-saving information and the second power-saving information comprise a cross-slot scheduling parameter and/or a minimum value of the cross-slot scheduling parameter, and the first information and the second information comprise data information or signal information, and/or downlink control information (DCI).

2. The method of claim 1, further comprising: in case that the second information is not transmitted,
 configuring, by the base station, to perform information transmission based on indication of the first power-saving information at the first time; or
 configuring to perform information transmission at the second time based on indication of default power-saving information; or
 configuring to perform information transmission at the second time based on R15; or
 configuring to perform unlimited transmission.

3. The method of claim 1, further comprising:
 configuring, by the base station, to indicate transmission at the second time, in case that the second power-saving information is not transmitted,
 wherein the configuring to indicate the transmission at the second time comprises:
 configuring to perform transmission of second information at the second time based on indication of the first power-saving information at the first time; or
 configuring to perform the transmission of the second information at the second time based on indication of default power-saving information; or
 configuring to perform the transmission of the second information at the second time based on R15; or
 configuring to perform unlimited transmission of the second information.

4. The method of claim 1, wherein the first carrier is a primary carrier, and the second carrier comprises at least one secondary carrier;
 in case that the first carrier and/or the second carrier are configured with different subcarrier spacing (SCS) or physical property numerology, the first power-saving information and/or second power-saving information are configured based on the first SCS or numerology, wherein the first SCS or numerology comprises:
 any one of the different SCS supported by the base station; or
 SCS corresponding to the first carrier and/or the second carrier; or
 SCS corresponding to BWP activated by the first carrier and/or the second carrier; or
 any SCS in a plurality of BWPs of the first carrier and/or the second carrier; or
 largest or smallest SCS among the plurality of BWPs of the first carrier and/or the second carrier; or
 SCS corresponding to an index of a largest or smallest BWP among the plurality of BWPs of the first carrier and/or the second carrier; or
 SCS in which the first information on the first carrier is located; or
 SCS in which the second information on the second carrier is located; or
 SCS in which the first power-saving information of the first carrier is located; or
 SCS in which the second power-saving information of the second carrier is located.

5. The method of claim 1, wherein the first carrier is a scheduling carrier, and the second carrier comprises a scheduling carrier and/or at least one scheduled carrier;
 in case that the first carrier and/or the second carrier are configured with different subcarrier spacing (SCS) or physical property numerology, the first power-saving information and/or second power-saving information are configured based on the first SCS or numerology, wherein the first SCS or numerology comprises:
 any SCS configured by the base station in the scheduling carrier; or
 smallest or largest SCS in the scheduling carrier; or
 SCS corresponding to an index of a smallest or largest carrier among the scheduling carriers; or
 SCS in which the first information on the first carrier is located; or
 SCS in which the second information on the second carrier is located; or
 SCS in which the first power-saving information of the first carrier is located; or
 SCS in which the second power-saving information of the second carrier is located.

6. The method of claim 1, wherein the first carrier and/or the second carrier comprises at least one carrier group; and the configuring, by the base station, the first power-saving information of the first carrier at the first time comprises:

configuring, by the base station, at least one power-saving information within the carrier group;

wherein in case that the number of power-saving information within the carrier group is greater than 1, a plurality of power-saving information are the same, or power-saving information types indicated by the plurality of power-saving information are the same;

in case that the first carrier and/or the second carrier are configured with different subcarrier spacing (SCS) or physical property numerology, the first power-saving information and/or second power-saving information are configured based on the first SCS or numerology, wherein the first SCS or numerology comprises:

any SCS configured by the base station in the carrier group; or smallest or largest SCS in the carrier group; or SCS corresponding to an index of a smallest or largest carrier among the scheduling carriers; or SCS in which the first information on the first carrier is located; or SCS in which the second information on the second carrier is located; or SCS in which the first power-saving information of the first carrier is located; or SCS in which the second power-saving information of the second carrier is located.

7. An electronic device comprising:
a processor; and
a memory storing computer programs, that in case of being executed by the processor, cause the processor to implement steps of the method for transmitting power-saving information of claim 1.

8. A method for transmitting power-saving information, comprising:
receiving, by a terminal, configured first power-saving information of a first carrier at a first time;
transmitting first information on the first carrier and/or a second carrier at the first time based on indication of the first power-saving information;
receiving configured second power-saving information of the first carrier and/or the second carrier at a second time; and
transmitting second information on the first carrier and/or the second carrier at the second time based on indication of the second power-saving information,
wherein the first power-saving information and the second power-saving information comprise a cross-slot scheduling parameter and/or a minimum value of the cross-slot scheduling parameter, and the first information and the second information comprise data information or signal information, and/or downlink control information (DCI).

9. The method of claim 8, further comprising: in case that the second information is not received,
transmitting information based on indication of the first power-saving information at the first time; or
transmitting information at the second time based on indication of default power-saving information; or
transmitting information at the second time based on R15; or
performing unlimited transmission at the second time.

10. The method of claim 8, further comprising: in case that the second power-saving information is not received,
transmitting second information at the second time based on the indication of the first power-saving information at the first time; or transmitting the second information at the second time based on indication of default power-saving information; or
transmitting the second information at the second time based on R15; or
performing unlimited transmission of the second information at the second time.

11. The method of claim 8, wherein the first carrier is a primary carrier, and the second carrier comprises at least one secondary carrier.

12. The method of claim 8, wherein the first carrier is a scheduling carrier, and the second carrier comprises a scheduling carrier and/or at least one scheduled carrier.

13. The method of claim 8, wherein the first carrier and/or the second carrier include at least one carrier group; and the receiving, by the terminal, the first power-saving information of the first carrier at the first time comprises:
receiving, by the terminal, at least one power-saving information within the carrier group;
wherein in case that the number of the plurality of power-saving information within the carrier group is greater than 1, a plurality of power-saving information are the same, or power-saving information types indicated by the plurality of power-saving information are the same.

14. The method of claim 8, wherein the second power-saving information has a size no less than that of the first power-saving information.

15. The method of claim 11, wherein in case that the first carrier and/or the second carrier are configured with different subcarrier spacing (SCS) or physical property numerology, the first power-saving information and/or second power-saving information configured based on the first SCS or numerology is received, wherein the first SCS or numerology comprises:
any one of the different SCS supported by a base station; or
SCS corresponding to the first carrier and/or the second carrier; or
SCS corresponding to the BWP activated by the first carrier and/or the second carrier; or
any SCS in a plurality of BWPs of the first carrier and/or the second carrier; or
largest or smallest SCS among the plurality of BWPs of the first carrier and/or the second carrier; or
SCS corresponding to an index of a largest or smallest BWP among the plurality of BWPs of the first carrier and/or the second carrier; or
SCS in which the first information on the first carrier is located; or
SCS in which the second information on the second carrier is located; or
SCS in which the first power-saving information of the first carrier is located; or
SCS in which the second power-saving information of the second carrier is located.

16. The method of claim 12, wherein in case that the first carrier and/or the second carrier are configured with different subcarrier spacing (SCS) or physical property numerology, the first power-saving information and/or second power-saving information configured based on the first SCS or numerology is received, wherein the first SCS or numerology comprises:
any SCS configured by a base station in the scheduling carrier; or
smallest or largest SCS in the scheduling carrier; or SCS corresponding to an index of the smallest or largest carrier among the scheduling carriers; or SCS in which the first information on the first carrier is located; or SCS in which the second information on the second carrier is located; or SCS in which the first power-saving information of the first carrier is located; or SCS in which the second power-saving information of the second carrier is located.

17. The method of claim 13, further comprises that in case that the first carrier and/or the second carrier are configured with different subcarrier spacing (SCS) or physical property numerology, the first power-saving information and/or second power-saving information are configured based on the first SCS or numerology, wherein the first SCS or numerology comprises:

any SCS configured by a base station in the carrier group; or, smallest or largest SCS in the carrier group; or SCS corresponding to an index of a smallest or largest carrier among scheduling carriers; or SCS in which the first information on the first carrier is located; or SCS in which the second information on the second carrier is located; or SCS in which the first power-saving information of the first carrier is located; or SCS in which the second power-saving information of the second carrier is located.

18. An electronic device comprising:

a processor; and a memory storing computer programs, that in case of being executed by the processor, cause the processor to implement the steps of:

receiving configured first power-saving information of a first carrier at a first time;

transmitting first information on the first carrier and/or a second carrier at the first time based on indication of the first power-saving information;

receiving configured second power-saving information of the first carrier and/or the second carrier at a second time; and transmitting second information on the first carrier and/or the second carrier at the second time based on indication of the second power-saving information, wherein the first power-saving information and the second power-saving information comprise a cross-slot scheduling parameter and/or a minimum value of the cross-slot scheduling parameter, and the first information and the second information comprise data information or signal information, and/or downlink control information (DCI).

* * * * *